United States Patent [19]

Lenhardt

[11] 4,347,978

[45] Sep. 7, 1982

[54] AGRICULTURAL SPRAYER

[75] Inventor: Theodore Lenhardt, Winter Garden, Fla.

[73] Assignee: Raym Company, Inc., Mascotte, Fla.

[21] Appl. No.: 174,850

[22] Filed: Aug. 4, 1980

[51] Int. Cl.³ .............. A01N 17/08

[52] U.S. Cl. .............. 239/78

[58] Field of Search .............. 239/77, 78, 380

[56] References Cited

U.S. PATENT DOCUMENTS

| | | | |
|---|---|---|---|
| 2,220,082 | 11/1940 | Daugherty | 239/77 |
| 2,321,792 | 6/1943 | Bowie | 239/77 |
| 2,476,960 | 7/1949 | Daugherty | 239/77 X |
| 2,608,441 | 8/1952 | Daugherty | 239/77 |
| 2,643,155 | 6/1953 | Wright et al. | 239/78 |
| 2,686,990 | 8/1954 | Matthews | 239/77 X |
| 2,746,794 | 5/1956 | Fish | 239/77 |
| 3,013,728 | 12/1961 | Banovac | 239/77 |
| 3,216,664 | 11/1965 | Wolford et al. | 239/77 |
| 3,310,231 | 3/1967 | Wininger | 239/78 X |
| 3,321,137 | 5/1967 | Carter | 239/78 |
| 3,335,943 | 8/1967 | Sorrenti | 239/77 X |
| 3,489,351 | 1/1970 | Patterson | 239/78 X |
| 4,019,682 | 4/1977 | Smith | 239/77 |
| 4,026,469 | 5/1977 | Frankel et al. | 239/78 |

*Primary Examiner*—Robert B. Reeves
*Assistant Examiner*—Gene A. Church
*Attorney, Agent, or Firm*—Duckworth, Allen, Dyer and Pettis

[57] ABSTRACT

An agricultural sprayer, particulary effective for use in orange groves or orchards utilizes a high velocity, high volume axial flow fan which directs air through a plenum chamber in which the air is divided to flow towards opposed lateral openings at the sides of the sprayer. The sprayer is provided with an oscillator for directing the flow of air so that the air flow varies from a substantially downward direction to a substantially upwards direction during the spraying operation. The axial flow fan is mounted relatively high with respect to the ground to avoid the pick up of debris and the like.

8 Claims, 9 Drawing Figures

FIG. 3
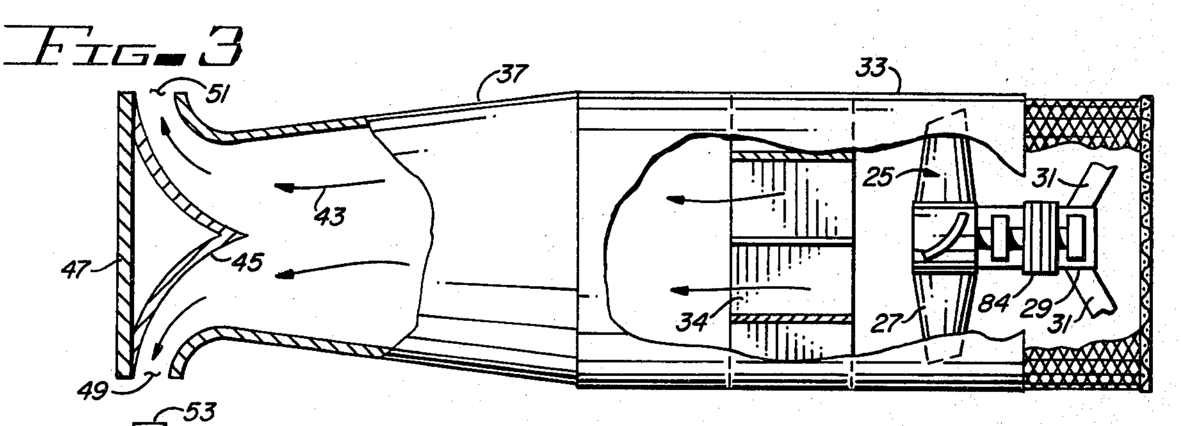
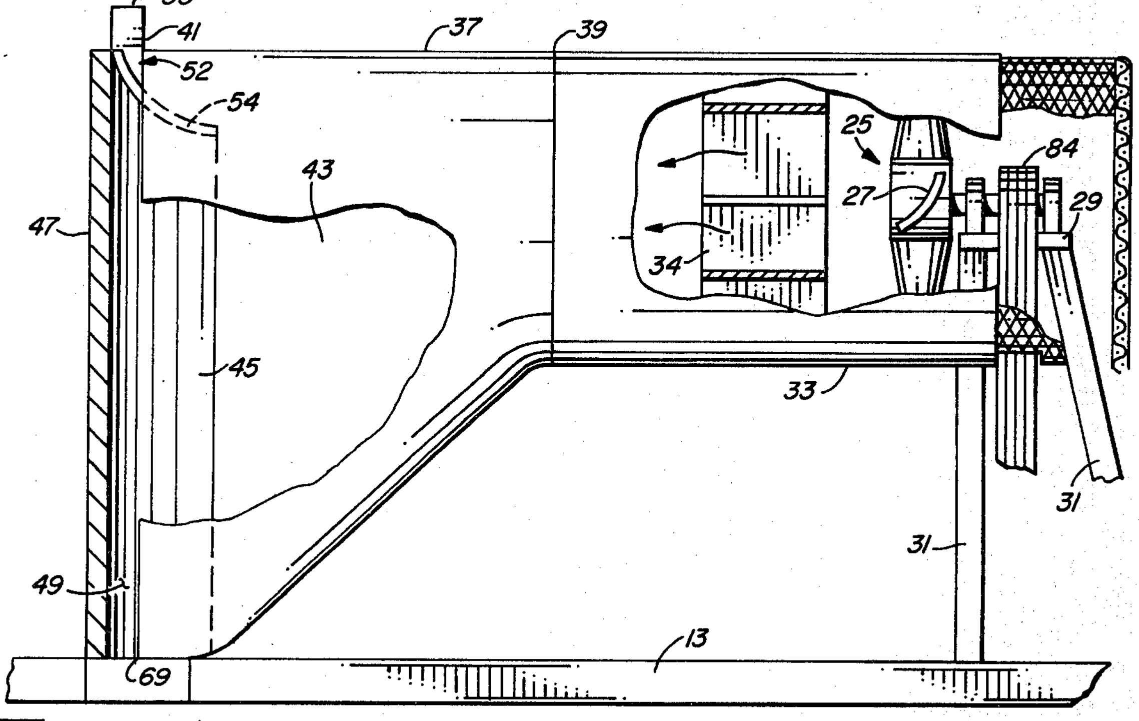
FIG. 4
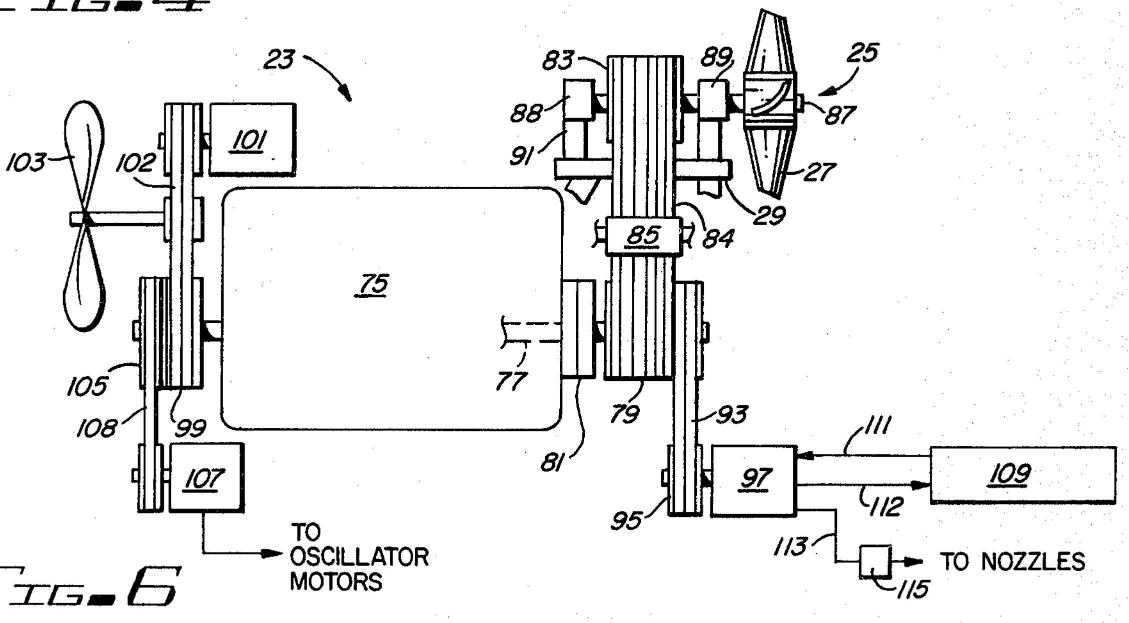
FIG. 6

AGRICULTURAL SPRAYER

BACKGROUND OF THE INVENTION

This invention relates to improvements in agricultural and horticultural spraying and dusting apparatus, and more particularly involves an improvement in the control of air flow, and penetration of chemicals into the foliage of trees, for example, in orange groves or orchards.

There have been described many agricultural sprayers which are drawn by tractors, trucks and the like for the spraying of liquid solids and solids in suspension or emulsion in carrying liquids. Most of these devices have large propellers or a number of propellers which create an air flow which carries the chemical to be deposited on the foliage. While these sprayers are adequate to deposit chemicals on most of the foliage, they have proved totally inadequate to deposit chemicals onto the leaf canopy and in particular within what is termed the cone area of the tree. In a typical radio atmospheric sprayer such as those described in the prior art, the radial spray travels a significant distance before it reaches the vegetations. The trees, which may range up to at least twenty-five feet, are not completely contacted by the chemical spray in this type of agricultural sprayer. The reason is that the spray air velocity drops off significantly after it leaves the sprayer and as the velocity decreases the chemical being sprayed begins to fall. This results in reduced penetration which in turn results in a semi-conical area at the top of the tree being left substantially untouched by the sprayed chemical. It has been found that for trees which may easily reach twenty-five to thirty feet high, that standard agricultural sprayers are incapable of reaching the cone area of the tree which is left essentially untouched by the chemical. This results in insect pests being left substantially untouched by the chemical and slowly building up an immunity to all chemicals due to minor ingestation of the chemical over a number of generations.

U.S. Pat. No. 2,220,082 to G. W. Dougherty described the typical axial type sprayer wherein a propeller drives the air which picks up the chemical, such as dust, which is then externally directed to the foliage by a series of veins. U.S. Pat. No. 2,321,792 to Adrian St. J. Bowie describes an apparatus for atomizing liquid off a vibrating plate within the air flow. U.S. Pat. Nos. 2,476,960 and 2,608,411 both to G. W. Dougherty, describe spraying machines which use various shaped propellers to obtain first an axial flow and then a radial spray outwardly and upwardly from the machines. These devices are typical of those which provide a ring of air carrying the chemical to the plant foliage.

In U.S. Pat. No. 2,686,990 to V. H. Mathews a device disclosed capable of directing two blasts of air from the same side of the sprayer converging outside the machine to deposit the chemical on the tree or bush. In U.S. Pat. No. 2,746,794 to R. H. Fish, radial nozzles are provided with a radial flow of air by an axial fan. Similarly, radial nozzles with a radial flow of air are used in U.S. Pat. No. 3,216,664 to G. Wolford, et al; U.S. Pat. No. 3,335,943 to S. S. Sorrente; and U.S. Pat. No. 3,013,728 to C. D. Banovac.

In a later patent, U.S. Pat. No. 4,019,682 to Smith, an axial fan is disclosed which forces air through peripherial outlets in the chamber in a direction substantially radially of the fan axis and the flow is used to entrain the chemical to be sprayed. In this device, the downstream chamber is provided into a plurality of axially extending air passages spaced angularly about the fan axis.

SUMMARY OF THE INVENTION

The agricultural sprayer of the invention includes a high velocity axial flow fan which is disposed relatively high from the ground in order to avoid the picking up of debris. The fan directs a large volume of air into a plenum chamber having a deflecting plate which directs and divides the air flow into two opposed lateral openings or emitter orifices at each side of the agricultural sprayer, and two horizontal openings at the top of the sprayer. The lateral openings are in the shape of a vertical slot. Disposed within each lateral opening is an oscillating system which includes a vertical rod having paired vanes which rotate at a predetermined rate. The rotation of the paired vanes results in oscillation, i.e. the flow initially being downwards, then substantially lateral, then substantially upwards, and then substantially lateral. This cycle is repeated for each revolution of the vertical rod of the oscillating system. The chemical in the form of a liquid is injected into the air flow immediately after the oscillating system through a plurality of nozzles. The high air velocity atomizes the liquid into microscopic droplets which are easily carried to the vegetation. The device has the advantage that the oscillating system increases penetration by moving and separating the canopy of the tree being sprayed.

BRIEF DESCRIPTION OF THE DRAWINGS

Further details are explained below with the help of the examples illustrated in the attached drawings in which:

FIG. 3 is a top cut away view of the agricultural sprayer;

FIG. 4 is a partial cut away cross sectional view of the air handling section of the agricultural sprayer;

FIG. 6 is a schematic of the drive module of the agricultural sprayer;

DETAILED DESCRIPTION OF THE PREFERRED EMBODIMENT

Figure 1:
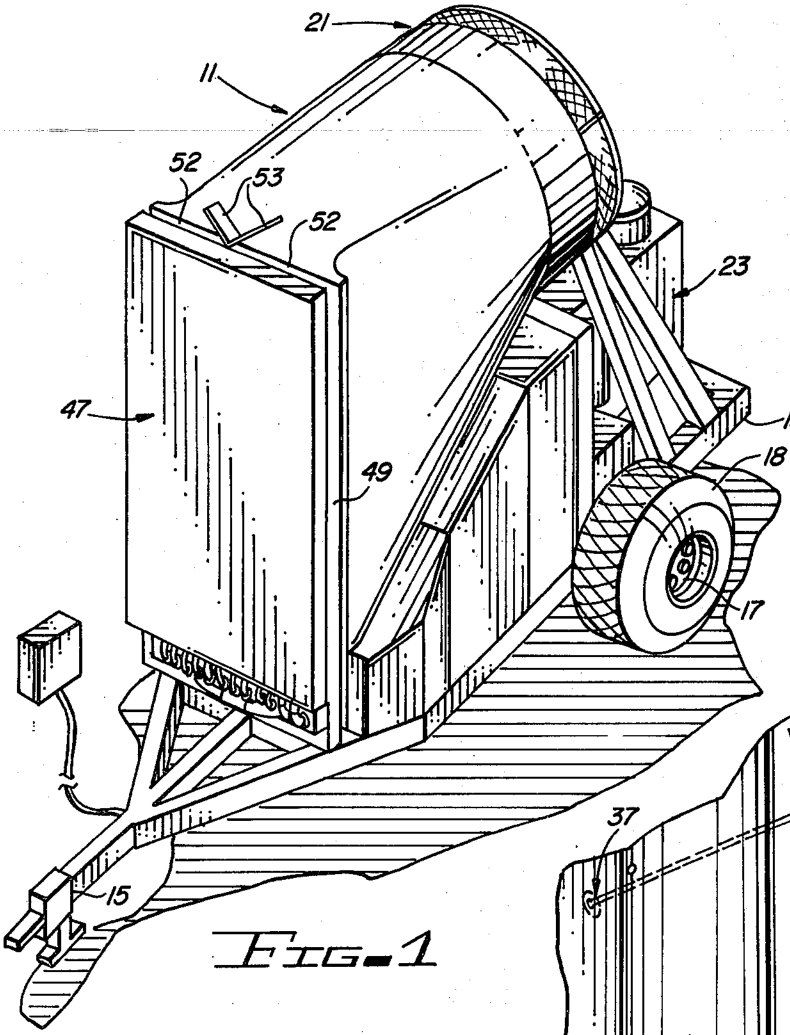
FIG. 1 is a perspective front view of the agricultural sprayer of this invention.
Figure 2:
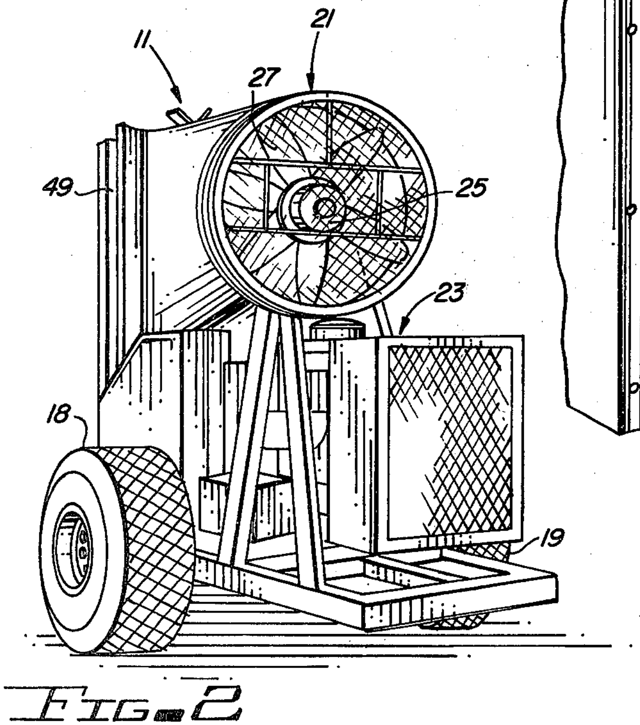
FIG. 2 is a perspective rear view of the sprayer.

The agricultural sprayer 11 of the present invention is shown in perspective views in FIG. 1 and FIG. 2. The sprayer is supported by a chassis 13 which consists of tubular steel preferrably three by six by three/sixteenths of an inch, and is essentially a rectangular steel frame pulled by a tractor or similar vehicle by hitch 15. The chassis 13 is provided with an axle 17 which supports pneumatic wheels 18 and 19. As shown in FIG. 1 and FIG. 2 the chassis supports an air handling section 21 and a drive module 23 which are discussed in detail below.

The air handling section 21 is comprised of an axial flow fan 25, shown in FIGS. 3 and 4, with the capability of building pressure without cavitation, which would disturb the flow of air. The blades 27 of the fan 25 are of airfoil design therefore with taper in order to prevent cavitation. The fan is supported by platform 29 which is in turn supported by a pair of beams 31 which are welded to the chassis 13. The blades of the fan are surrounded by a cylindrical covering 33 of the predetermined length and which is provided with a series of axially disposed thin plates 34 to serve as flow straighteners. The cylindrical covering 33 is coupled to an intermediate section 37 which has a circular cross sectional area at its initial point 39 and a rectangular cross sectional area at the end point 41. The angle that the intermediate section 37 makes with the cylindrical cover 33 is kept at approximately fifteen degrees for efficient flow characteristics. The intermediate section 37 forms a plenum chamber 43. A V-shaped flow divider 45 is secured to end wall 47 which is in turn secured to the chassis 13. The flow divider 45 serves to change the direction of flow of air from axial to radial. The flow divider 45 extends vertically throughout the height of the intermediate section 37 (as shown in FIG. 4). The flow of air exits at lateral openings 49 and 51 which serve as emitter orifices and are disposed at the end of the intermediate section 37. A pair of horizontal openings 52 are disposed at the top of the agricultural sprayer. The combined cross sectional area of lateral openings 49 and 51 and the horizontal openings 52 is approximately sixty percent of the area of the circular cross sectional area of the cylindrical covering 33 and of the intermediate section 37 at the initial point 39. This thereby achieves compression and higher velocity at the flow. The bottom point of the lateral openings 49 and 51 (shown in FIG. 4 as 69) is disposed approximately forty-five inches from the ground in the preferred embodiment. As is explained below that distance may vary depending on different parameters such as the distance between the trees, bushes or vines of an orchard or grove.

In the preferred embodiment lateral opening 49 and 51 extend upward at least one half the height of the vegetations to be sprayed. The width of the lateral opening is determined by the necessary reduction in area so that the combined area of the lateral openings 49 and 51 and the horizontal openings 52 is approximately sixty percent of the area of the fan. At the top of end section 47 there is secured a deflecting plate 53 which is set at about a forty-five degree angle to prevent the air flow from going straight upwards and to direct the flow at the optimum angles to the sides. Although it is necessary to prevent a strictly vertical flow, it is desired to impart the flow a significant vertical component so that the flow direction is substantially forty-five degrees. It is therefore necessary to attach a scoop 54 at the top of the intermediate section 37 in order to provide a significant vertical component to the air flowing out of the top of the lateral openings 49 and 51.

Figure 5:
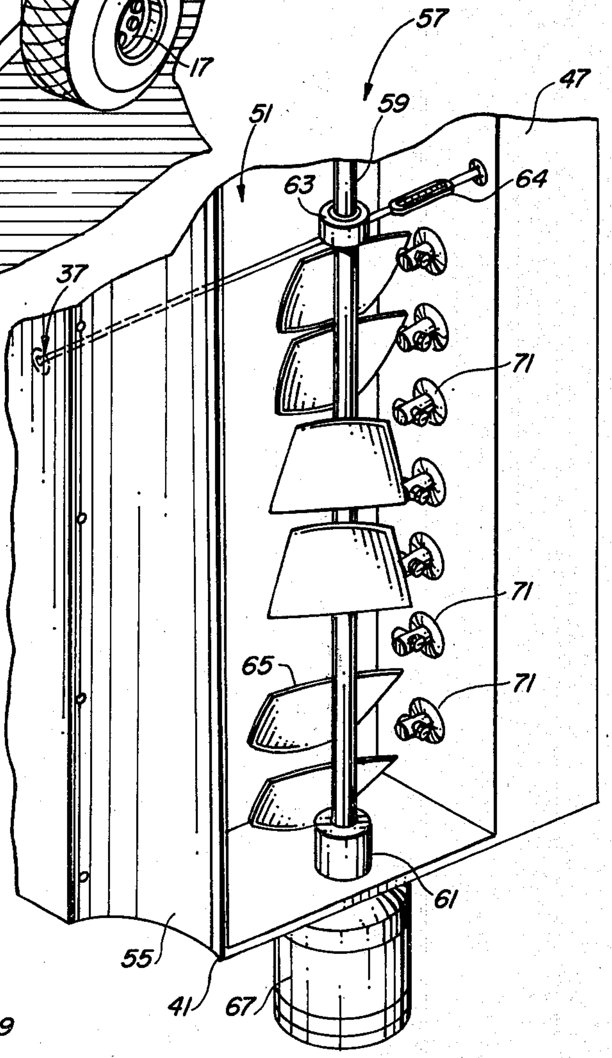
FIG. 5 is a detailed view of the oscillating system of the invention.

FIG. 5 is a detail of the lateral opening 51 showing end point 41. As can be seen from FIG. 5, the end point 41 coincides with the end point of a curved plate 55 which helps to direct the flow in the radial direction. Shown in detail in this figure is the oscillating system 57 which comprises a vertical rod 59 supported by a main drive bearing 61 and a plurality of secondary bearings 63 disposed at predetermined distances along the vertical rod 59. The secondary bearings 63 are provided for support and to prevent buckling. The secondary bearings 63 are secured to the end wall 47 and to the intermediate section 37 by means of turn buckles 64.

Welded on to the vertical rod 49 are a plurality of paired vanes 65 which are disposed on opposite sides of the vertical rod 59 and are oriented so that a pair of paired vanes 65 points downwardly, and the next pair directly above it and on the opposite side of the vertical rod 59 point upwardly. The angle that each vane 65 makes with the vertical rod 59 is approximately forty-five degrees for greater efficiency in the penetration of the canopies of trees.

In operation the combination of the vertical rod 59 and the paired vanes 65 provide an oscillation of the combined air and chemicals. In the initial position, a plurality of paired vanes are downwardly disposed in the interior of the opening while the paired vanes in the exterior of the lateral opening 51 are pointing upwards. This result is an upward direction of the flow of air. As the vertical rod rotates a full one hundred and eighty degrees, the vanes that point upwardly will be in the interior of the lateral opening 51, while the vanes that point downwardly will be in the exterior. This results in a downward flow of air. At positions intermediate between the zero degrees and one hundred and eighty degree precision of the vanes the flow of air will change from an upward to a downward, back to an upward direction. The length of the vanes 65 and the spacing of the vanes on the vertical rod 59 are selected so that the end point of the vane overlaps the starting point of the adjacent vane on the vertical rod. In that manner gaps are left and the direction of the air flow is substantially parallel to the direction of the vanes 65. In the preferred embodiment the vanes 65 on the vertical rod 59 are approximately four and one-half inches apart. Integrally formed with the main drive bearing 61 is a variable speed hydraulic motor 67 which serves to turn the vertical rod 59 to provide the oscillation function.

Also shown in FIG. 5 are a plurality of emitting nozzles 71 which are disposed on end wall 47. These nozzles are in communication with a water tank (not shown) and are used to inject the desired liquid chemicals into the air stream provided by the axial fan. As can be appreciated the rate of turning of the vertical rod 59 can be controlled so that the rate of the oscillations can vary depending on the desired property of the spray.

There is an oscillating system 57 in each lateral opening 49 and 51, and each turns in an opposite direction from the other. In normal operations the oscillating system 57 in lateral opening 49 turns clockwise and the oscillating system 57 in lateral opening 51 turns counterclockwise. This arrangement of rotation is used to impart a horizontal component of velocity in the direction of travel of the agricultural sprayer 11. The flow leaving the lateral openings 49 and 51 are therefore given a forward velocity component.

The drive module 23 of the agricultural sprayer 11 is shown schematically in FIG. 6. The drive module includes a motor 75 which can be any open type of power unit such as an internal combustion deisel engine having adequate horsepower. The drive shaft 77 of the motor 75 is coupled to an eight groove pulley 79 by means of a clutch 81. The clutch 81 can be used to disengage the shaft on which eight groove pulley 79 is attached from the drive shaft 77 while the motor 75 is warming up or starting, thereby providing a low load condition during start up. The eigth groove pulley 79 is connected to a six groove pulley 83 by means of six fan belts 84. The belts are tensioned by idler 85. The six groove pulley 83 is attached to a fan shaft 87 which is supported by a pair of bearings 88 and 89. The bearings are supported by the platform 29 which is in turn attached to the chassis 13. The fan shaft 87 provides the power to the axial flow fan 25 and is connected to the fan blades 27. A pair of drive belts 93 are used to couple the eight groove pulley with a two groove pulley 95 which is used to drive a water pump 97. In a typical motor 75 a two groove pulley 99 is provided and is coupled to a generator 101 and a cooling fan 103 by means of a pair of drive belts 102. In the present invention an additional pulley 105 is provided adjacent to the two groove pulley 99 and is coupled to the hydraulic pump 107 by means of belt 108. As can be appreciated from the explanation of the clutch device 81 above, during the start up the only load on the motor 75 will be the hydraulic motor 107 and fan 103 and generator 101. Once the motor is warmed up clutch 81 is thrown thereby causing shaft 77 to turn pulley 79 which will in turn power the axial flow fan 25 and the water pump 97. On shut down the clutch 81 is disengaged so that the load is minimized when the motor 75 is turned off. This procedure protects belts, bearings and motor.

The hydraulic pump 107 provides hydraulic pressure for the hydraulic motors 67 for the oscillating system 57.

The water pump 97 may be a standard modular three inch pump and is used to pump water from a water tank 109 to the emitting nozzles 71 of the oscillating system 57. The pump additionally provides agitation to the water tank 109. The pump consists of one inlet duct 111 and two outlet ducts 112 and 113. The outlet duct 112 is connected to the water tank 109 and provides agitation of the liquid in the water tank 109. The outlet duct 113 is connected to a spray control mechanism 115.

Figure 7:
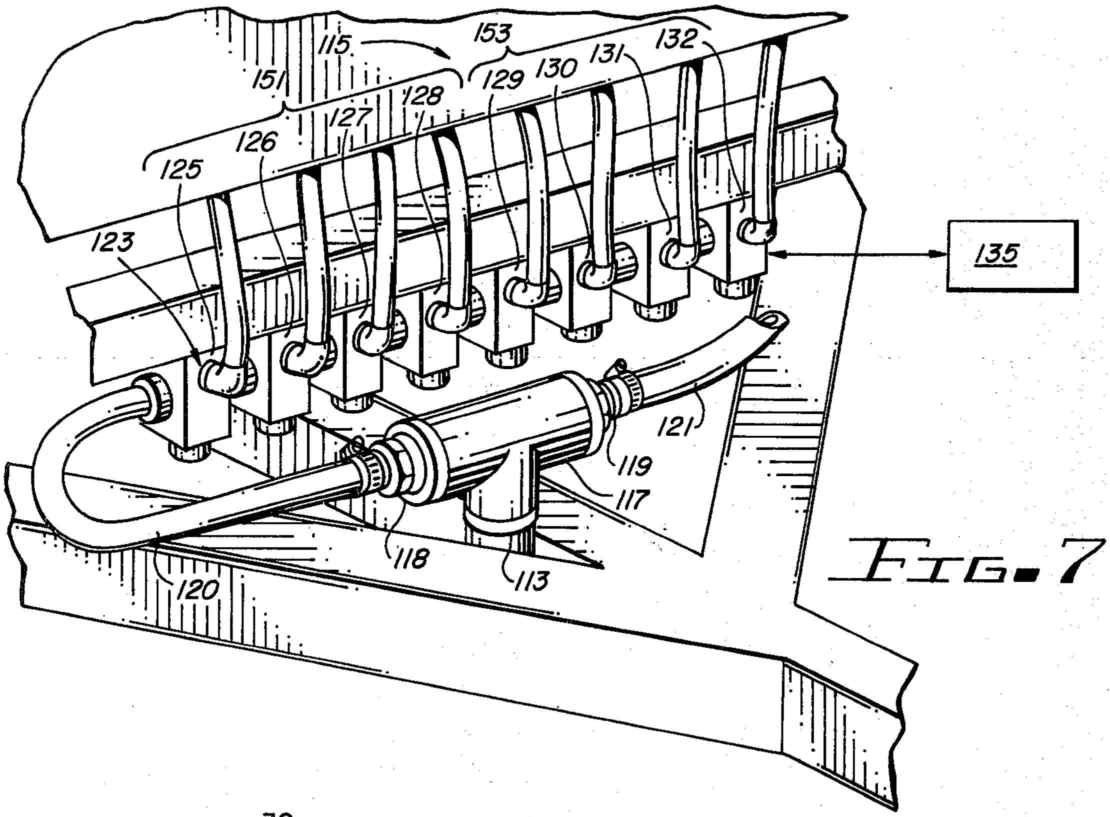
FIG. 7 is an illustration of the spray control mechanism.

The spray control mechanism 115, as shown in FIG. 7, comprises a T-discharge joing 117 having an input from the outlet duct 113, and two outputs 118 and 119 of reduced area. liquid comes into the T-discharge joint through outlet duct 113 and is divided into two lines 120 and 121 which are connected to a manifold 123. Manifold 123 comprises a plurality of electrically controlled valves 125–132. In the preferred embodiment there are eight valves. The eight electrically controlled valves 125–132 are separated into two sets, of four valves 151 and 153. The first set of valves 151 is connected with a plurality of emitting nozzles 71 disposed in the lateral opening 49 and the other set of valves 153 is connected to the emitting nozzles 71 disposed in lateral opening 51. Therefore, four valves in the manifold are used for each side of the sprayer. In the preferred embodiment each valve control six emitting nozzles disposed on one side of the agricultural sprayer 11. In the preferred embodiment there are a total of twenty-four emitting nozzles on each side of the sprayer. Electric control means 135 is provided to control the number of valves in the manifold that are in the open position at any one time. This provides for great flexibility since all eight valves can be operational thereby resulting in the emission of liquids from all twenty-four nozzles at each side of the agricultural sprayer. Alternatively, some of the valves may be closed thereby limiting the number of nozzles that emit chemicals. This can control the height of the spray being emitted since each valve is connected to a bank of spray nozzles.

Figure 8:
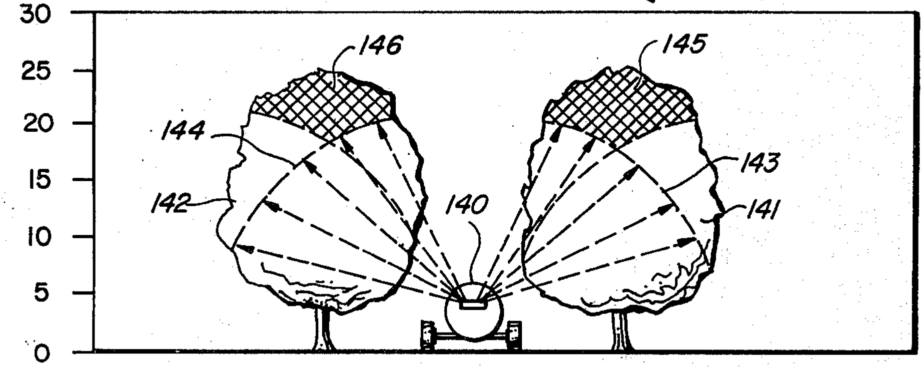
FIG. 8 is a schematic of the spray pattern of prior art devices.
Figure 9:
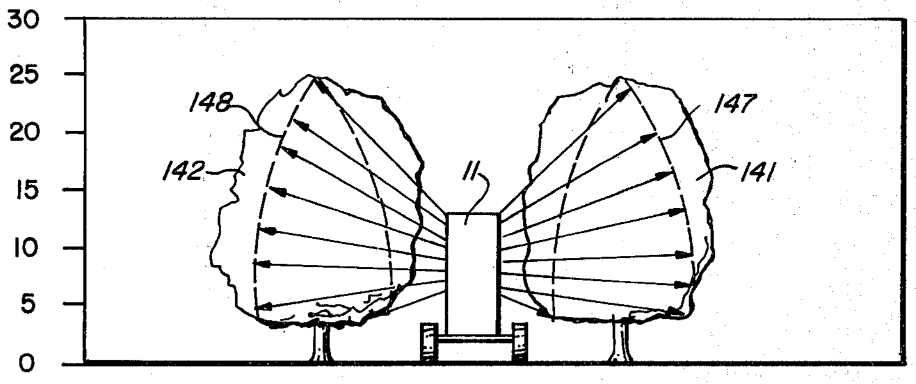
FIG. 9 is a schematic of the spray pattern of the present invention.

The advantages to be derived by the agricultural sprayer 11 of the present invention can best be illustrated in FIGS. 8 and 9. FIG. 8 illustrates the spray pattern of a typical sprayer 140 that is now in wide use. The spray, depicted by arrows cannot penetrate the canopy of the trees 141 and 142 sufficiently to spray the interior leaves. The depth of penetration is shown as dashed lines 143 and 144. That system leaves an unsprayed conical volume or cone 145 or 146 in each tree.

The agricultural sprayer 11 of the present invention has greater penetration because of the oscillating system. The lines of penetration are shown as dotted lines 147 and 148. Because of the greater penetration the cone 145 of FIG. 8 is minimized, if not eliminated, thereby maximizing the area of the tree that is sprayed.

We claim:

1. An agricultural sprayer comprising:

a chassis;

a source of liquid material to be sprayed carried on said chassis;

an axial flow fan disposed on said chassis to generate a substantially axial flow of air;

a flow divider disposed adjacent said fan;

an intermediate covering section surrounding said flow divider, and adjacent to said fan, said covering section having a substantially rectangular cross section at its distal end and a substantially circular cross section at the end proximate to said fan;

an end wall section disposed a predetermined distance from the distal end of the intermediate covering, said end wall section, flow divider and intermediate covering defining a plenum chamber with a pair of vertically disposed emitter orifices;

a plurality of nozzles disposed at predetermined intervals on said end wall section, said nozzles coupled to the source of liquid material to be sprayed;

a pair of shafts each disposed inside said plenum chamber and adjacent to a corresponding one of the emitter orifices defined by the intermediate covering section and the end wall section;

means coupled to said shafts for rotating said shafts;

a vane system attached to each shaft, each vane system comprising a first plurality of vanes attached at their respective end to the shaft at a predetermined angle; and a second plurality of vanes each one attached to the shaft a predetermined distance away from and on an opposite side of a respective one of said first plurality of vanes whereby rotation of the shaft will cause the air flow to abruptly change from an upward direction to a horizontal direction and then to a downward direction.

2. The sprayer of claim 1 wherein said means for rotating said shafts comprises means for rotating said shafts opposite to each other.

3. The sprayer of claim 1 wherein said predetermined angle is approximately forty-five degrees.

4. The sprayer of claim 1 wherein said predetermined distance is smaller than the geometric projection of the vane on the shaft.

5. The agricultural sprayer of claim 1 wherein said vanes are flat plates having a substantially straight edge at the point of attachment to the shaft.

6. The agricultural sprayer of claim 1 wherein said plurality of nozzles comprises a first and second plurality of nozzles each disposed proximate to a corresponding edge of the end wall section and the emitter orifice formed by said end wall section, said nozzles being disposed adjacent to the shafts and vanes whereby the liquid to be sprayed is entrained by the air flow through the vanes.

7. The sprayer of claim 6 further comprising means for valving the flow of liquids to at least a number of said plurality of nozzles, whereby the spray pattern can be controlled.

8. An agriculture sprayer comprising:

a chassis;

a source of liquid material to be sprayed carried on said chassis;

an axial flow fan disposed on said chassis to generate a substantially axial flow of air;

a flow divider disposed adjacent said fan;

an intermediate covering section surrounding said flow divider, and adjacent to said fan, said covering section having a substantially rectangular cross section at its distal end and a substantially circular cross section at the end proximate to said fan;

a end wall section disposed a predetermined distance from the distal end of the intermediate covering, said end wall section, flow divider and intermediate covering defining a plenum chamber with a pair of vertically disposed emitter orifices;

a plurality of nozzles disposed at predetermined intervals on said end wall section, said nozzle coupled to the source of liquid material to be sprayed;

a pair of shafts each disposed inside said plenum chamber and adjacent to one of the emitter orifices defined by the intermediate covering section and the end wall section;

means for rotating said shafts;

a vane system attached to each shaft each vane system comprising:

a first plurality of pairs of vanes each vane of each pair attached to the shaft at a predetermined angle and disposed a predetermined distance from the other vane in said pair; and a second plurality of pairs of vanes each pair disposed a predetermined distance away from and on an opposite side of a respective pair said first plurality of pairs of vanes whereby rotation of the shaft will cause the air flow to abruptly change from an upward direction to a horizontal direction and then to a downward direction.

* * * * *